(12) United States Patent
Pawley et al.

(10) Patent No.: US 7,275,628 B2
(45) Date of Patent: Oct. 2, 2007

(54) OVERRUNNING COUPLING ASSEMBLY HAVING IMPROVED SHIFT FEEL AND/OR NOISE REDUCTION

(75) Inventors: Brice A. Pawley, Midland, MI (US); Jeffrey J. Prout, Freeland, MI (US)

(73) Assignee: Means Industries Inc., Saginaw, MI (US)

( * ) Notice: Subject to any disclaimer, the term of this patent is extended or adjusted under 35 U.S.C. 154(b) by 170 days.

(21) Appl. No.: 11/148,513

(22) Filed: Jun. 9, 2005

(65) Prior Publication Data

US 2006/0278488 A1    Dec. 14, 2006

(51) Int. Cl.
*F16D 41/12*    (2006.01)

(52) U.S. Cl. .................. 192/46; 192/30 V; 192/52.6; 192/69.1

(58) Field of Classification Search .......... 192/69.1, 192/52.3, 52.6
See application file for complete search history.

(56) References Cited

U.S. PATENT DOCUMENTS

| | | | |
|---|---|---|---|
| 4,823,926 A * | 4/1989 | Wittler et al. ............. | 192/30 V |
| 5,852,932 A | 12/1998 | Matsumoto | |
| 6,032,774 A | 3/2000 | Gadd | |
| 6,125,980 A | 10/2000 | Ruth et al. | |
| 6,193,038 B1 | 2/2001 | Scott et al. | |
| 6,290,044 B1 | 9/2001 | Burgman et al. | |
| 6,745,880 B1 | 6/2004 | Yuergens | |
| 2003/0188947 A1 * | 10/2003 | Fitz et al. .................. | 192/46 |

* cited by examiner

*Primary Examiner*—Rodney H. Bonck
(74) *Attorney, Agent, or Firm*—Brooks Kushman P.C.

(57) ABSTRACT

An overrunning coupling assembly having improved shift feel and/or noise reduction is provided. The assembly includes planar first and second members rotatable about a first axis. In a locked position, torque transfer is permitted between the first and second members in a first direction about the first axis. In a disengaged position, the first and second members are permitted to free-wheel relative to each other in a second direction opposite the first direction. A compliant retaining device retains the first and second members together and absorbs axial impact loads. The retaining device is less compliant in the locked position than in the disengaged position to decrease axial force at time of axial impact and improve shift feel and/or noise reduction. In a first embodiment, the retaining device includes a wave spring. In a second embodiment, the retaining device includes a stepped weir plate.

14 Claims, 2 Drawing Sheets

OVERRUNNING COUPLING ASSEMBLY HAVING IMPROVED SHIFT FEEL AND/OR NOISE REDUCTION

BACKGROUND OF THE INVENTION

1. Field of the Invention

This invention relates to overrunning coupling assemblies and, in particular, to overrunning coupling assemblies having improved shift feel and/or noise reduction.

2. Background Art

Overrunning coupling assemblies are used for transferring torque from a driving member to a driven member in a variety of structural environments. This permits the transfer of torque from a driving member to a driven member while permitting freewheeling motion of the driving member relative to the driven member when torque is interrupted.

For purposes of this disclosure, the term coupling should be interpreted to include clutches or brakes wherein one of the plates is drivably connected to a torque delivery element of a transmission and the other plate is drivably connected to another torque delivery element or is anchored and held stationary with respect to a transmission housing. The terms coupling, clutch and brake may be used interchangeably.

A pocket plate may be provided with angularly disposed recesses or pockets about the axis of a one-way clutch. The pockets are formed in the planar surface of the pocket plate. Each pocket receives a torque transmitting pawl or strut, one end of which engages an anchor point in a pocket of the pocket plate. An opposite edge of the strut, which may hereafter be referred to as an active edge, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Pawl-type clutches inherently have shift bump issues. Impact loading is described from the following formula:

$$F^*t = m^*V.$$

Stated in words: average force multiplied by impact time equals mass multiplied by change in velocity. If one could somehow increase the time, there would be a corresponding decrease in force at time of impact.

U.S. Pat. Nos. 5,852,932; 6,032,774; and 6,745,880 show the use of a wave spring to assist a pawl or strut into a locked position. For example, U.S. Pat. No. 5,852,932 show such an arrangement as well as the use of a compression spring to absorb shock in a circumferential direction.

U.S. Pat. Nos. 6,745,880; 6,032,774; and 5,852,932 also show a wave spring utilized to assist a strut or pawl into a locked position. For example, the prior art wave spring of the '932 patent engages a "drive dog" style clutch.

The '774 patent discloses the combination of a drive dog and a ratcheting style one-way clutch (i.e., OWC) in combination with a wave ring. The wave ring disengages the dog style clutch.

The wave spring of the '880 patent is used to bias a controllable mechanism which is attached to a roller system.

U.S. Pat. No. 6,125,980 discloses an overrunning coupling assembly including a snap ring or retainer device.

U.S. Pat. No. 6,193,038 discloses a one-way clutch including a retaining device such as a weir or snap ring disposed in a groove defined by first and second members of an outer plate assembly.

U.S. Pat. No. 6,290,044 discloses a selectable one-way clutch assembly including a weir plate installed in a groove of a drum to absorb forces.

However, a need still exists for an overrunning coupling assembly which addresses shift bump issues to thereby improve shift feel and/or noise reduction.

SUMMARY OF THE INVENTION

An object of the present invention is to provide an overrunning coupling assembly having improved shift feel and/or noise reduction.

In carrying out the above object and other objects of the present invention, an overrunning coupling assembly having improved shift feel and/or noise reduction is provided. The assembly includes a planar first member rotatable about a first axis having an inside first surface extending generally normal to the first axis. The first member has at least one recess formed in the first surface. A planar second member is rotatable about the first axis and has an inside second surface extending generally normal to the first axis and is disposed closely adjacent to the first surface. The second surface has at least one notch formed therein. At least one key is received and retained in the at least one recess. The at least one key is movable between a notch-engaging, locked position in which torque transfer is permitted between the first and second members in a first direction about the first axis and a disengaged position in which the first and second members are permitted to free-wheel relative to each other in a second direction opposite the first direction. A compliant retaining device retains the members together and absorbs axial impact loads. The retaining device is less compliant in the locked position than in the disengaged (i.e., overrun) position to decrease axial force at time of axial impact and improve shift feel and/or noise reduction.

The assembly may further include an annular groove formed in one of the members. The retaining device may include a deflectable annular ring received and retained in the annular groove.

The annular ring may include a wave spring for biasing one of the members in the disengaged position to provide proper free-wheeling axial clearance between the inside surfaces. The annular groove may have a width sufficient to allow the wave spring to deflect within the groove under axial load. The wave spring may absorb axial impact loads adjacent its inside diameter prior to seating itself within the groove adjacent its outside diameter to carry operational loads.

The annular ring may include a stepped weir plate having inside and outside diameters. The weir plate may absorb axial impact loads by deflecting axially, especially at its inside diameter.

The assembly may further include at least one biasing member carried by the first member and urging the at least one key toward the second surface.

The first member may include a pocket plate.

The second member may include a notch plate.

Further in carrying out the above object and other objects of the present invention, an overrunning coupling assembly having improved shift feel and/or noise reduction is provided. The assembly includes a planar first member rotatable about a first axis and has an inside first surface extending generally normal to the first axis. The first member has a plurality of recesses formed in the first surface. A planar second member is rotatable about the first axis and has an inside second surface extending generally normal to the first axis and disposed closely adjacent to the first surface. The second surface has a plurality of notches formed therein. A plurality of keys are received and retained in their respective recesses. The keys are movable between a notch-engaging, locked position in which torque transfer is permitted between the first and second members in a first direction about the first axis and a disengaged position in which the first and second members are permitted to free-wheel relative to each other in a second direction opposite the first direction. A compliant retaining device retains the members together and absorbs axial impact loads. The retaining device is less compliant in the locked position than in the disengaged position to decrease axial force at time of axial impact and improve shift feel and/or noise reduction.

The assembly may further include an annular groove formed in one of the members. The retaining device may include a deflectable annular ring received and retained in the annular groove.

The annular ring may include a wave spring for biasing one of the members in the disengaged position to provide proper free-wheeling axial clearance between the inside surfaces. The annular groove may have a width sufficient to allow the wave spring to deflect within the groove under axial load. The wave spring may absorb axial impact loads adjacent its inside diameter prior to seating itself within the groove adjacent its outside diameter to carry operational loads.

The annular ring may include a stepped weir plate having inside and outside diameters. The weir plate may absorb axial impact loads by deflecting axially, especially at its inside diameter.

The first member may include a pocket plate.

The second member may include a notch plate.

Still further in carrying out the above object and other objects of the present invention, an overrunning coupling assembly having improved shift feel and/or noise reduction is provided. The assembly includes a planar first member rotatable about a first axis and has an inside first surface extending generally normal to the first axis. The first member has a plurality of recesses formed in the first surface. A planar second member is rotatable about the first axis and has an inside second surface extending generally normal to the first axis and disposed closely adjacent to the first surface. The second surface has a plurality of notches formed therein. A plurality of keys are received and retained in their respective recesses. The keys are movable between a notch-engaging, locked position in which torque transfer is permitted between the first and second members in a first direction about the first axis and a disengaged position in which the first and second members are permitted to free-wheel relative to each other in a second direction opposite the first direction. A plurality of biasing members are carried by the first member and urge their respective keys toward the second surface. A compliant retaining device retains the first and second members together and absorb axial impact loads. The retaining device is less compliant in the locked position than in the disengaged position to decrease axial force at time of axial impact and improve shift feel and/or noise reduction.

The assembly may further include an annular groove formed in one of the members. The retaining device may include a deflectable annular ring received and retained in the annular groove.

The annular ring may include a wave spring for biasing one of the members in the disengaged position to provide proper free-wheeling axial clearance between the inside surfaces. The annular groove may have a width sufficient to allow the wave spring to deflect within the groove under axial load. The wave spring may absorb axial impact loads adjacent its inside diameter prior to seating itself within the groove adjacent its outside diameter to carry operational loads.

The annular ring may include a stepped weir plate having inside and outside diameters. The weir plate may absorb axial impact loads by deflecting axially especially at its inside diameter.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is an end view of the assembly of FIG. 1;

FIG. 3 is a sectional view take along lines 3-3 of FIG. 2;

DETAILED DESCRIPTION OF THE PREFERRED EMBODIMENTS

In general, the present invention relates to an overrunning coupling assembly including a compliant retaining device such as a wave spring or a stepped weir plate to improve shift feel of the assembly by absorbing axial impact loads which typically are a result of torque loads on the assembly.

Figure 1:
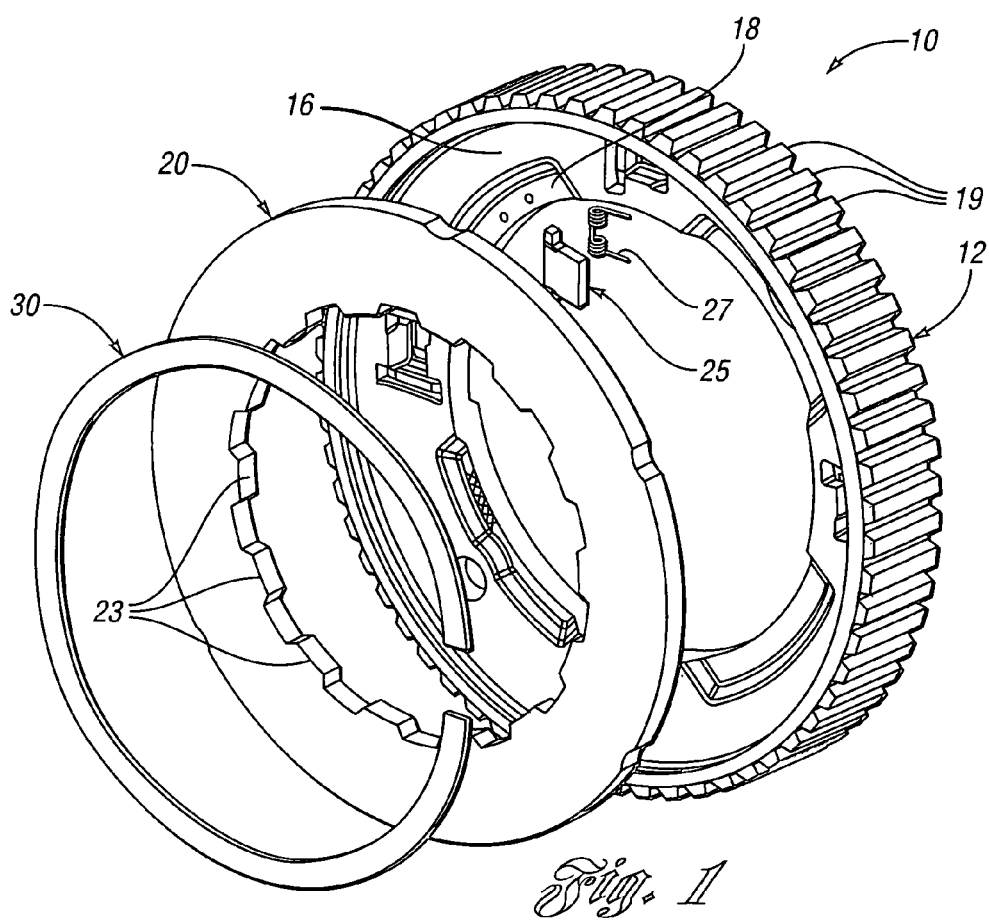
FIG. 1 is an exploded, perspective view of an overrunning coupling assembly constructed in accordance with one embodiment of the present invention.

Referring now to FIGS. 1-3, an overrunning coupling assembly constructed in accordance with the present invention is generally indicated at 10. The assembly 10 includes a planar first member or pocket plate, generally indicated at 12, rotatable about a first axis 14 and having an inside first surface 16 extending generally normal to the first axis 14. The first member 12 has a plurality of recesses 18 formed in the first surface 16.

Preferably, there are four recesses 18, however, some applications may only require a single recess.

The pocket plate 12 also includes a plurality of outer teeth 19 to allow the plate 12 to be drivingly coupled to another member.

The assembly 10 also includes a planar second member or notch plate, generally indicated at 20, also rotatable about the first axis 14 and having an inside second surface 22 (i.e., FIG. 3) extending generally normal to the first axis 14 and disposed closely adjacent to the first surface 16. The second surface 22 has a plurality of notches 24 formed therein. Typically, the number of notches 24 is greater than or equal to the number of recesses 18 formed in the plate 12.

The plate 20 also includes a plurality of inner teeth 23 to allow the plate 12 to be drivingly coupled to another member.

The assembly 10 further includes a plurality of keys or struts, generally indicated at 25, which are received and retained in their respective recesses 18. The keys 25 are movable between a notch-engaging, locked position, as shown in FIG. 3, in which torque transfer is permitted between the first and second members 12 and 20 in a first direction about the first axis 14 and a disengaged position in which the first and second members 12 and 20 are permitted to free-wheel relative to each other in a second direction opposite the first direction. The number of keys 25 is typically the same number as the number of recesses 18 but less than or equal to the number of notches 24.

The assembly further includes a plurality of biasing members or springs 27 also carried by the first member 12 and urging free ends of their respective keys 25 out of their respective recesses 18 and toward the second surface 22 of the plate 20.

The assembly 10 still further includes a compliant retaining device, generally indicated at 30, to retain the first and second members 12 and 20 together and absorb axial impact loads. In general, the retaining device 30 is less compliant in the locked position than in the disengaged position to decrease axial force at time of axial impact and improve shift feel of the assembly 10. The assembly 10 further includes an annular groove 32 formed in one of the first and second members such as the member 12. The retaining device 30 preferably comprises a deflectable annular ring received and retained in the annular groove 32. In the embodiment of FIGS. 1-3, the annular ring comprises a wave spring 30 for biasing one of the first and second members such as the member 20 in the disengaged position to provide proper free-wheeling axial clearance between the inside surfaces 16 and 22. The annular groove 32 has a width sufficient to allow the wave spring 30 to deflect within the groove 32 under axial load, as best shown in FIG. 3.

Figure 4:
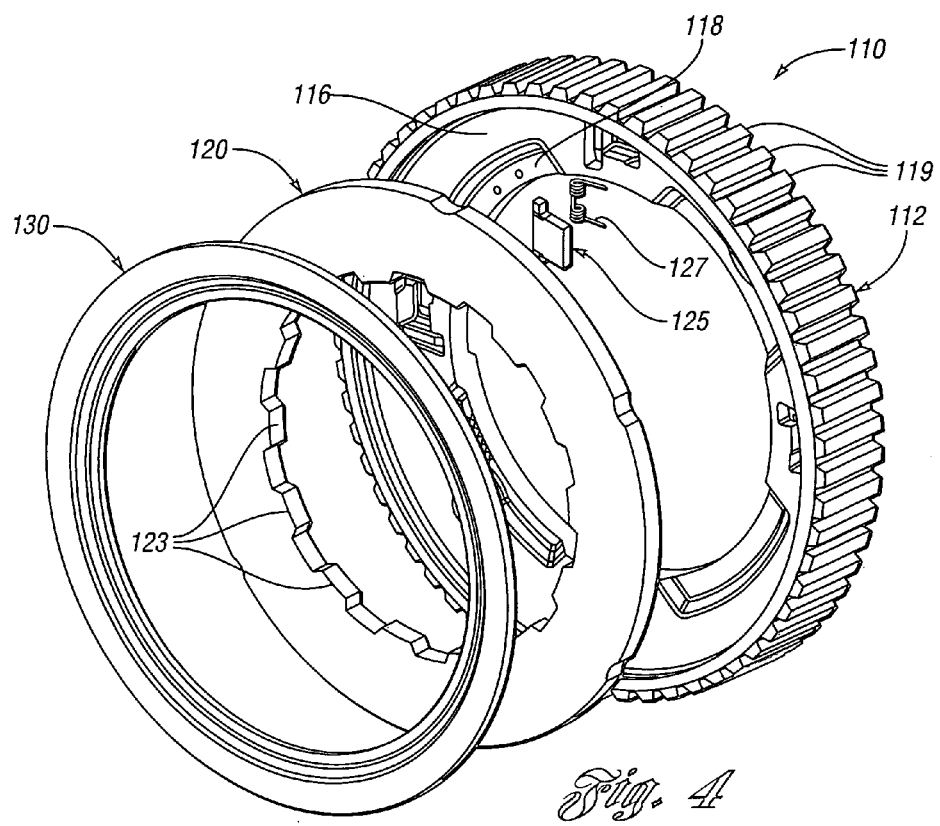
FIG. 4 is an exploded, perspective view of an overrunning coupling assembly constructed in accordance with another embodiment of the present invention.
Figures 5, 6:
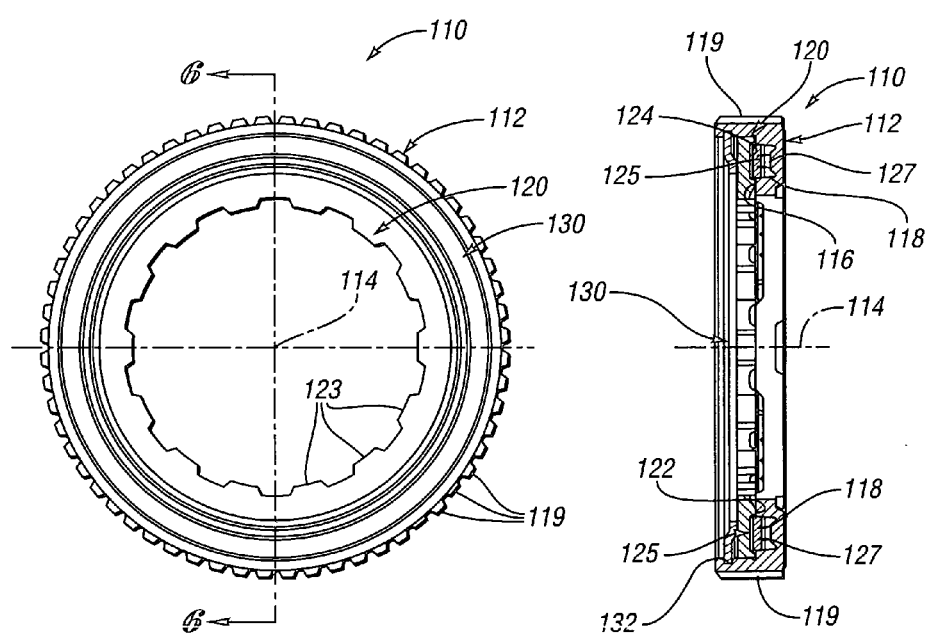
FIG. 5 is an end view of the assembly of FIG. 4.
FIG. 6 is a sectional view taken along lines 6-6 of FIG. 5.

Referring now to FIGS. 4-6, an overrunning coupling assembly constructed in accordance with a second embodiment of the present invention is generally indicated at 110. The assembly 110 includes a planar first member or pocket plate, generally indicated at 112, rotatable about a first axis 114 and having an inside first surface 116 extending generally normal to the first axis 114. The first member 112 has a plurality of recesses 118 formed in the first surface 116.

Preferably, there are four recesses 118, however, some applications may only require a single recess.

The pocket plate 112 also includes a plurality of outer teeth 119 to allow the plate 112 to be drivingly coupled to another member.

The assembly 110 also includes a planar second member or notch plate, generally indicated at 120, also rotatable about the first axis 114 and having an inside second surface 122 (i.e., FIG. 6) extending generally normal to the first axis 114 and disposed closely adjacent to the first surface 116. The second surface 122 has a plurality of notches 124 formed therein. Typically, the number of notches 124 is greater than or equal to the number of recesses 118 formed in the plate 112.

The plate 120 also includes a plurality of inner teeth 123 to allow the plate 112 to be drivingly coupled to another member.

The assembly 110 further includes a plurality of keys or struts, generally indicated at 125, which are received and retained in their respective recesses 118. The keys 125 are movable between a notch-engaging, locked position, as shown in FIG. 6, in which torque transfer is permitted between the first and second members 112 and 120 in a first direction about the first axis 114 and a disengaged position in which the first and second members 112 and 120 are permitted to free-wheel relative to each other in a second direction opposite the first direction. The number of keys 125 is typically the same number as the number of recesses 118 but less than or equal to the number of notches 124.

The assembly further includes a plurality of biasing members or springs 127 also carried by the first member 112 and urging free ends of their respective keys 125 out of their respective recesses 118 and toward the second surface 122 of the plate 120.

The assembly 110 still further includes a compliant retaining device, generally indicated at 130, to retain the first and second members 112 and 120 together and absorb axial impact loads. In general, the retaining device 130 is less compliant in the locked position than in the disengaged position to decrease axial force at time of axial impact and improve shift feel and/or noise reduction of the assembly 110. The assembly 110 further includes an annular groove 132 formed in one of the first and second members such as the member 112. The retaining device 130 preferably comprises a deflectable annular ring received and retained in the annular groove 132.

In the embodiment of FIGS. 4-6, the annular ring comprises a stepped weir plate 130 for biasing one of the first and second members such as the member 120 in the disengaged position to provide proper free-wheeling axial clearance between the inside surfaces 116 and 122.

As described above, both the wave spring or ring 20 and the stepped weir plate 120 are positioned to absorb axial impact loads. Because both the wave spring 20 and the weir plate 120 are less compliant at time of locked condition or position, the time associated with the impact event increases. The increase in time, which may be a number of milliseconds, results in a decrease in force at time of axial impact. In other words, the spring 20 and the plate 120 absorb the energy of the system over a longer period of time. Axial impact loading is described by the following formula as previously noted:

$$F*t=m*V.$$

Stated in words: average axial force multiplied by impact time equals mass multiplied by change in velocity.

The stepped weir plate 120 absorbs axial impact loads by deflecting axially especially near its inside diameter.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An overrunning coupling assembly having improved shift feel and/or noise reduction, the assembly comprising:

a planar first member rotatable about a first axis and having an inside first surface extending generally normal to the first axis, the first member having at least one recess formed in the first surface;

a planar second member rotatable about the first axis and having an inside second surface extending generally normal to the first axis and disposed closely adjacent to the first surface, the second surface having at least one notch formed therein;

at least one key received and retained in the at least one recess, the at least one key being movable between a notch-engaging, locked position in which torque transfer is permitted between the first and second members in a first direction about the first axis and a disengaged position in which the first and second members are permitted to free-wheel relative to each other in a second direction opposite the first direction;

a compliant retaining device to retain the members together and absorb axial impact loads, the retaining device being less compliant in the locked position than in the disengaged position to decrease axial force at time of axial impact and improve shift feel and/or noise reduction; and an annular groove formed in one of the members wherein the retaining device includes a deflectable annular ring received and retained in the annular groove and wherein the annular ring includes a wave spring for biasing one of the members in the disengaged position to provide proper free-wheeling axial clearance between the inside surfaces.

2. The assembly as claimed in claim 1 wherein the annular groove has a width sufficient to allow the wave spring to deflect within the groove under axial load.

3. The assembly as claimed in claim 1 further comprising at least one biasing member carried by the first member and urging the at least one key toward the second surface.

4. The assembly as claimed in claim 1, wherein the first member includes a pocket plate.

5. The assembly as claimed in claim 1, wherein the second member includes a notch plate.

6. An overrunning coupling assembly having improved shift feel and/or noise reduction, the assembly comprising:

a planar first member rotatable about a first axis and having an inside first surface extending generally normal to the first axis, the first member having at least one recess formed in the first surface;

a planar second member rotatable about the first axis and having an inside second surface extending generally normal to the first axis and disposed closely adjacent to the first surface, the second surface having at least one notch formed therein;

at least one key received and retained in the at least one recess, the at least one key being movable between a notch-engaging, locked position in which torque transfer is permitted between the first and second members in a first direction about the first axis and a disengaged position in which the first and second members are permitted to free-wheel relative to each other in a second direction opposite the first direction;

a compliant retaining device to retain the members together and absorb axial impact loads, the retaining device being less compliant in the locked position than in the disengaged position to decrease axial force at time of axial impact and improve shift feel and/or noise reduction; and an annular groove formed in one of the members wherein the retaining device includes a deflectable annular ring received and retained in the annular groove and wherein the annular ring includes a stepped weir plate having inside and outside diameters and wherein the weir plate absorbs axial impact loads by deflecting axially at least at its inside diameter.

7. An overrunning coupling assembly having improved shift feel and/or noise reduction, the assembly comprising:

a planar first member rotatable about a first axis and having an inside first surface extending generally normal to the first axis, the first member having a plurality of recesses formed in the first surface;

a planar second member rotatable about the first axis and having an inside second surface extending generally normal to the first axis and disposed closely adjacent to the first surface, the second surface having a plurality of notches formed therein;

a plurality of keys received and retained in their respective recesses, the keys being movable between a notch-engaging, locked position in which torque transfer is permitted between the first and second members in a first direction about the first axis and a disengaged position in which the first and second members are permitted to free-wheel relative to each other in a second direction opposite the first direction;

a compliant retaining device to retain the members together and absorb axial impact loads, the retaining device being less compliant in the locked position than in the disengaged position to decrease axial force at time of axial impact and improve shift feel and/or noise reduction; and an annular groove formed in one of the members wherein the retaining device includes a deflectable annular ring received and retained in the annular groove and wherein the annular ring includes a wave spring for biasing one of the members in the disengaged position to provide proper free-wheeling axial clearance between the inside surfaces.

8. The assembly as claimed in claim 7 wherein the annular groove has a width sufficient to allow the wave spring to deflect within the groove under axial load.

9. The assembly as claimed in claim 7, wherein the first member includes a pocket plate.

10. The assembly as claimed in claim 7, wherein the second member includes a notch plate.

11. An overrunning coupling assembly having improved shift feel and/or noise reduction, the assembly comprising:

a planar first member rotatable about a first axis and having an inside first surface extending generally normal to the first axis, the first member having a plurality of recesses formed in the first surface;

a planar second member rotatable about the first axis and having an inside second surface extending generally normal to the first axis and disposed closely adjacent to the first surface, the second surface having a plurality of notches formed therein;

a plurality of keys received and retained in their respective recesses, the keys being movable between a notch-engaging, locked position in which torque transfer is permitted between the first and second members in a first direction about the first axis and a disengaged position in which the first and second members are permitted to free-wheel relative to each other in a second direction opposite the first direction;

a compliant retaining device to retain the members together and absorb axial impact loads, the retaining device being less compliant in the locked position than in the disengaged position to decrease axial force at time of axial impact and improve shift feel and/or noise reduction; and an annular groove formed in one of the members wherein the retaining device includes a deflectable annular ring received and retained in the annular groove and wherein the annular ring includes a stepped weir plate having inside and outside diameters and wherein the weir plate absorbs axial impact loads by deflecting axially a least at its inside diameter.

12. An overrunning coupling assembly having improved shift feel and/or noise reduction, the assembly comprising:

a planar first member rotatable about a first axis and having an inside first surface extending generally normal to the first axis, the first member having a plurality of recesses formed in the first surface;

a planar second member rotatable about the first axis and having an inside second surface extending generally normal to the first axis and disposed closely adjacent to the first surface, the second surface having a plurality of notches formed therein;

a plurality of keys received and retained in their respective recesses, the keys being movable between a notch-engaging, locked position in which torque transfer is permitted between the first and second members in a first direction about the first axis and a disengaged position in which the first and second members are permitted to free-wheel relative to each other in a second direction opposite the first direction;

a plurality of biasing members carried by the first member and urging their respective keys toward the second surface;

a compliant retaining device to retain the first and second members together and absorb axial impact loads, the retaining device being less compliant in the locked position than in the disengaged position to decrease axial force at time of axial impact and improve shift feel and/or noise reduction; and an annular groove formed in one of the members wherein the retaining device includes a deflectable annular ring received and retained in the annular groove and wherein the annular ring includes a wave spring for biasing one of the members in the disengaged position to provide proper free-wheeling axial clearance between the inside surfaces.

13. The assembly as claimed in claim 12, wherein the annular groove has a width sufficient to allow the wave spring to deflect within the groove under axial load.

14. An overrunning coupling assembly having improved shift feel and/or noise reduction, the assembly comprising:

a planar first member rotatable about a first axis and having an inside first surface extending generally normal to the first axis, the first member having a plurality of recesses formed in the first surface;

a planar second member rotatable about the first axis and having an inside second surface extending generally normal to the first axis and disposed closely adjacent to the first surface, the second surface having a plurality of notches formed therein;

a plurality of keys received and retained in their respective recesses, the keys being movable between a notch-engaging, locked position in which torque transfer is permitted between the first and second members in a first direction about the first axis and a disengaged position in which the first and second members are permitted to free-wheel relative to each other in a second direction opposite the first direction;

a plurality of biasing members carried by the first member and urging their respective keys toward the second surface;

a compliant retaining device to retain the first and second members together and absorb axial impact loads, the retaining device being less compliant in the locked position than in the disengaged position to decrease axial force at time of axial impact and improve shift feel and/or noise reduction; and an annular groove formed in one of the members wherein the retaining device includes a deflectable annular ring received and retained in the annular groove and wherein the annular ring includes a stepped weir plate having inside and outside diameters and wherein the weir plate absorbs axial impact loads by deflecting axially at least at its inside diameter.

* * * * *